(12) United States Patent
Teng et al.

(10) Patent No.: US 7,926,072 B2
(45) Date of Patent: Apr. 12, 2011

(54) APPLICATION PROGRAMMING INTERFACE FOR PROVIDING NATIVE AND NON-NATIVE DISPLAY UTILITY

(75) Inventors: Albert Teng, Cupertino, CA (US); Jack Yuan, Cupertino, CA (US); Xiao Bin, Shanghai (CN)

(73) Assignee: Spring Design Co. Ltd., Taipei (TW)

( * ) Notice: Subject to any disclaimer, the term of this patent is extended or adjusted under 35 U.S.C. 154(b) by 677 days.

(21) Appl. No.: 12/033,608

(22) Filed: Feb. 19, 2008

(65) Prior Publication Data

US 2009/0085920 A1   Apr. 2, 2009

Related U.S. Application Data

(60) Provisional application No. 60/997,255, filed on Oct. 1, 2007.

(51) Int. Cl.
  *G06F 3/00* (2006.01)
  *G06F 13/00* (2006.01)
  *G09G 5/00* (2006.01)
(52) U.S. Cl. .......... 719/328; 719/321; 719/323; 345/1.1
(58) Field of Classification Search ................. 719/321, 719/323, 328; 345/1.1
  See application file for complete search history.

(56) References Cited

U.S. PATENT DOCUMENTS

| | | | |
|---|---|---|---|
| 5,488,572 A | 1/1996 | Belmont | |
| 5,493,335 A | 2/1996 | Parulski et al. | |
| 5,847,698 A | 12/1998 | Reavey et al. | |
| 6,336,161 B1 | 1/2002 | Watts | |
| 6,353,700 B1 | 3/2002 | Zhou | |
| 6,628,244 B1 | 9/2003 | Hirosawa et al. | |
| 6,931,265 B2 | 8/2005 | Reyes et al. | |
| 7,581,034 B2 * | 8/2009 | Polivy et al. | 709/250 |
| 7,631,267 B2 * | 12/2009 | Viji et al. | 715/763 |
| 7,634,780 B2 * | 12/2009 | Rhoten et al. | 719/328 |
| 7,711,868 B2 * | 5/2010 | Rhoten et al. | 710/15 |

(Continued)

FOREIGN PATENT DOCUMENTS

EP    1205824 A2    5/2002

OTHER PUBLICATIONS

International Search Report and Written Opinion, PCT/US07/78208, Mar. 25, 2008, 14 pages.

(Continued)

*Primary Examiner* — Qing Wu
(74) *Attorney, Agent, or Firm* — Fenwick & West LLP (57) ABSTRACT

Methods for controlling complementary dual displays for use with an electronic device are presented including: receiving an input for display on a non-native display, where the input includes a native user interface (UI) input and a non-native UI input, and where the non-native display is a bistable, low frame rate display; if the input is the native UI input, sending the first native UI input to a corresponding application, processing the native UI input by the corresponding application, calling a non-native API for forwarding the processed native UI input to a non-native display driver, and sending a non-native display signal to the non-native display; receiving another native UI input for display on a native display, where the native display is a refresh-based, high frame rate display; and sending the other native UI input to the corresponding application.

33 Claims, 8 Drawing Sheets

U.S. PATENT DOCUMENTS

| | | |
|---|---|---|
| 7,748,634 B1 | 7/2010 | Zehr et al. |
| 7,784,065 B2 * | 8/2010 | Polivy et al. .................. 719/328 |
| 2002/0067319 A1 | 6/2002 | Hensel |
| 2002/0126133 A1 | 9/2002 | Ewins |
| 2002/0149541 A1 | 10/2002 | Shin |
| 2002/0158812 A1 | 10/2002 | Pallakof |
| 2003/0011534 A1 | 1/2003 | Rengan et al. |
| 2003/0160771 A1 | 8/2003 | Fraser et al. |
| 2004/0190080 A1 | 9/2004 | Kodama et al. |
| 2004/0196210 A1 | 10/2004 | Nagatsuka et al. |
| 2004/0225613 A1 | 11/2004 | Narayanaswami et al. |
| 2004/0257367 A1 | 12/2004 | Smith et al. |
| 2005/0225556 A1 | 10/2005 | Booth |
| 2006/0017659 A1 | 1/2006 | Ogawa et al. |
| 2006/0050090 A1 | 3/2006 | Ahmed et al. |
| 2006/0077127 A1 | 4/2006 | Sampsell et al. |
| 2006/0083194 A1 | 4/2006 | Dhrimaj et al. |
| 2006/0146056 A1 | 7/2006 | Wyatt |
| 2006/0161977 A1 | 7/2006 | Jung et al. |
| 2006/0164324 A1 * | 7/2006 | Polivy et al. .................... 345/1.1 |
| 2006/0176271 A1 * | 8/2006 | Polivy et al. .................. 345/156 |
| 2006/0187142 A1 | 8/2006 | Lesniak |
| 2006/0197724 A1 | 9/2006 | Sakai |
| 2006/0242590 A1 * | 10/2006 | Polivy et al. .................. 715/760 |
| 2007/0046562 A1 * | 3/2007 | Polivy et al. .................... 345/1.2 |
| 2007/0052615 A1 * | 3/2007 | Van Dongen et al. ......... 345/1.1 |
| 2007/0118671 A1 | 5/2007 | Ganti |
| 2007/0174918 A1 | 7/2007 | Hirose et al. |
| 2007/0182663 A1 | 8/2007 | Biech |
| 2007/0242061 A1 * | 10/2007 | Rhoten et al. ................. 345/204 |
| 2008/0033996 A1 | 2/2008 | Kesari |
| 2008/0080010 A1 | 4/2008 | Korst |

OTHER PUBLICATIONS

International Search Report and Written Opinion, PCT/US07/78209, Mar. 25, 2008, 8 pages.

* cited by examiner

APPLICATION PROGRAMMING INTERFACE FOR PROVIDING NATIVE AND NON-NATIVE DISPLAY UTILITY

PRIORITY CLAIM TO PROVISIONAL APPLICATION

A claim for priority is hereby made under the provisions of 35 U.S.C. §119 for the present application based upon U.S. Provisional Application No. 60/997,255, filed on Oct. 1, 2007 which is incorporated herein by reference.

BACKGROUND

LCD-based electronic devices such as Ultra Mobile PC (UMPC), laptops/PCs, personal digital assistants (PDAs), cellular phones, portable digital media players, and the like are becoming ubiquitous in modern technological societies. These devices offer specialized functionality in form factors small enough to carry in a pocket or some other small carrying bag. At least one reason why these types of devices are so popular is because display technology, which provides a convenient user interface, has advanced to a point where relatively small form factors are efficient and inexpensive. Indeed, even the most inexpensive portable electronic devices now include high frame rate color displays. However, conventional displays are not without some disadvantages.

Typically, a PDA may include a refresh-based, high frequency (REHF) display for displaying user selected information. One example of an REHF display is a liquid crystal display (LCD). LCDs have many desirable characteristics including high frame rates which provide for a satisfying visual experience when rapidly switching between screens or when scrolling across a screen. However, typical displays having high screen refresh rates may suffer from poor readability because backlights, which are required in those displays, may be adversely affected by ambient lighting conditions. Eye strain is commonly reported by users and has been documented in some medical literature. Users of UMPCs or PDAs are familiar with the poor readability of LCDs under bright light or direct sunlight. In some examples, shading the screen or moving to a darker environment may be necessary to read an LCD. In other examples, LCD can not offer high quality image such as EPD which has close to 300 dpi today.

In order to overcome the shortcomings of an LCD, bistable, low frequency (BILF) displays may be utilized instead of an LCD. One example of a BILF display is an electronic paper display (EPD). EPDs utilize a material called electronic ink and are commercially available under the trade name E INK®. EPDs are ideally suited for flexible display applications due to their thin form factor and inherent flexibility. EPDs provide an image stable reflective display technology that uses ultra-low power but is easily read under any lighting condition including direct sunlight. In addition, EPDs provide a bistable display and unlike LCDs, an image on an EPD looks the same from all viewing angles. Further, EPDs will not distort when touched or flexed, making EPDs the ideal display medium for flexible displays and portable devices. EPDs however, cannot, in many examples, completely replace LCDs. At least one reason is because EPDs typically have a low frame rate. As noted above, conventional LCDs are typically configured with high frame rates, which may serve to enhance a user's viewing experience especially when rapidly scrolling through multiple displays. In addition, using a mouse requires high frame rates so that the mouse pointer appears to have smooth movement across a screen. Furthermore, a majority of reading content is currently created for viewing with an REHF display application such as an LCD application while few applications are written for BILF displays such as an EPD. This trend is likely to continue. It may, therefore, be advantageous to easily display the output of existing REHF display applications on BILF displays such as an EPD.

Unfortunately, Conventional operating system windows managers are typically configure to manage only multiple LCD task windows across multiple LCD displays. Thus, conventional solutions for REHF-based (LCD) applications on conventional platforms can not generally benefit from the use of multiple BILF and REHF displays. As such, application programming interfaces for providing native and non-native display utility are presented herein.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
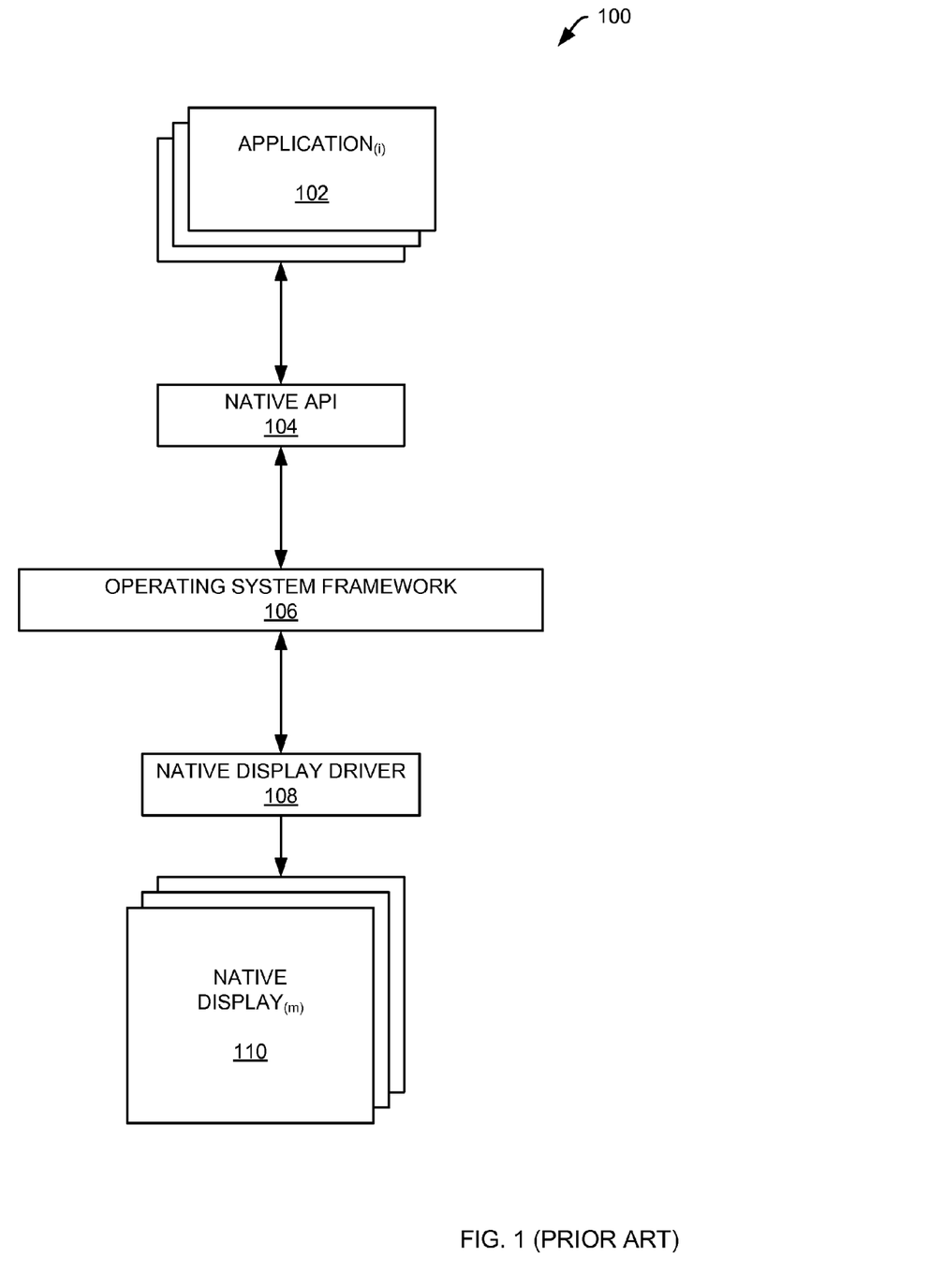
FIG. 1 is a prior art illustrative representation of a native display subsystem system for an application that utilizes a native display.

FIG. 1 is a prior art illustrative representation of a native display sub-system 100 for an application 102 that utilizes a native display 110. As noted above, conventional operating system windows managers are typically configured to manage only multiple LCD task windows across multiple LCD displays. As illustrated, applications$_{(i)}$ 102 may be running on a conventional operating system. Application$_{(i)}$ 102 represents any number of applications running concurrently on a computing system. Application$_{(i)}$ 102 may be in cooperative communication with native application programming interface (API) 104. A native API is a source code interface that an operating system or library provides to support requests for native services to be made of it by computer programs such as application(s) 102. Native API 104 communicates with operating system framework 106 to manage data communications from application 102$_{(i)}$. Operating system framework 106 processes data communications and communicates the results of the processing to native display driver 108, which may drive any number of native displays$_{(m)}$ 110 without departing from the present invention. A resulting graphical user interface may then be displayed on native display$_{(m)}$ 110. In some embodiments, native display driver 108 may also be configured as part of a native display sub-system that contains a windows management system along with a UI input system in addition to the native display driver.

Figure 2:
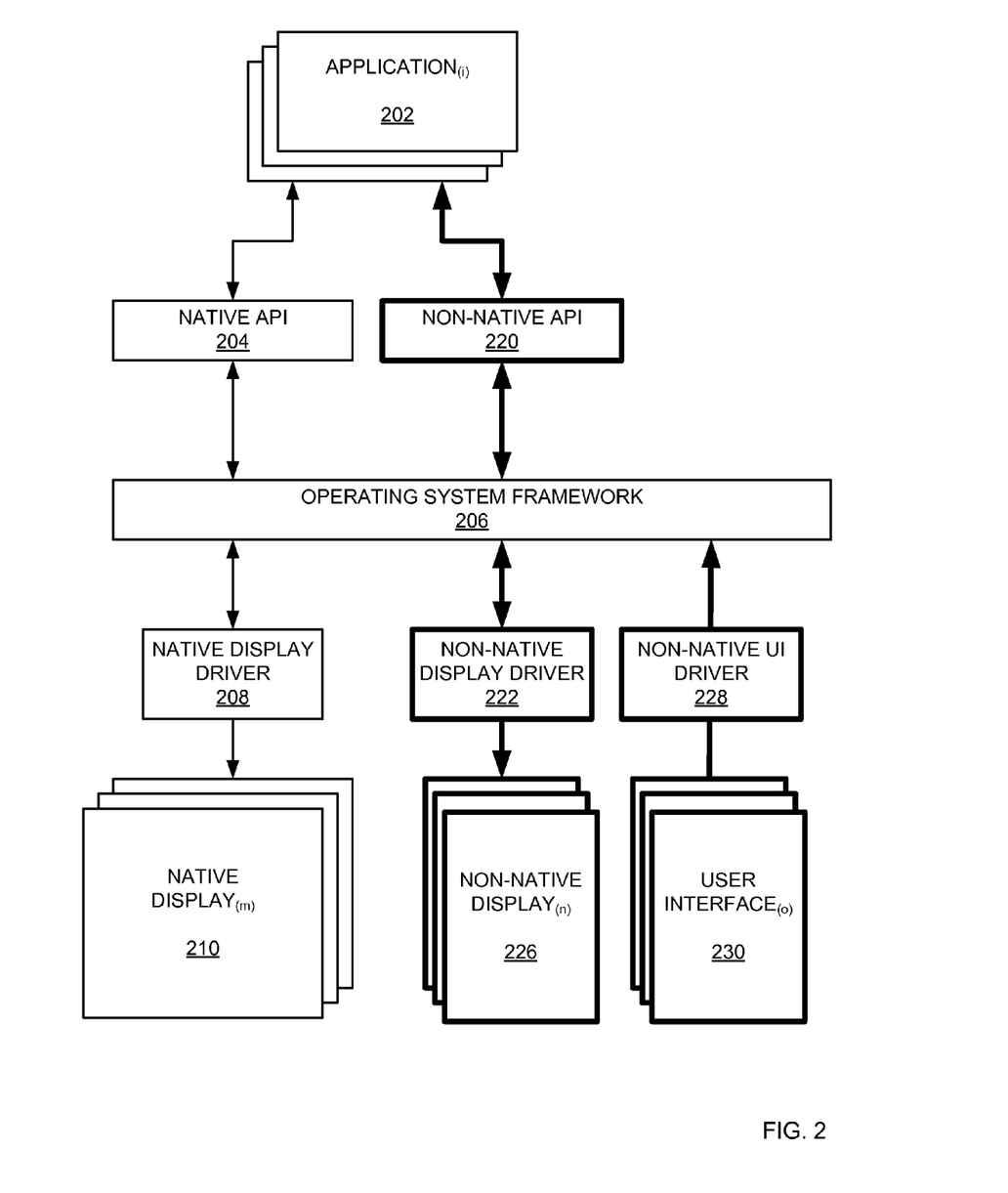
FIG. 2 is an illustrative representation of a native and non-native display subsystem system for utilizing a native display and a non-native display in accordance with embodiments of the present invention.

FIG. 2 is an illustrative representation of a native and non-native display subsystem 200 for utilizing a native display 210 and a non-native display 226 in accordance with embodiments of the present invention. As illustrated, applications$_{(i)}$ 202 may be running on a conventional operating system. In some embodiments, application(s) 202 represents any number of applications running substantially concurrently on an computing system without departing from the present invention. Application$_{(i)}$ 202 may be in cooperative communication with native API 204. In some embodiments, a native API may include: a WINDOWS™ enabled API, a WINDOWS™ CE enabled API, a WINDOWS™ mobile enabled API, an APPLE™ iphone enabled API, An APPLE™ OS X enabled API, a Linux enabled API, a UNIX enabled API, and a UNIX derivative enabled API. A native API is a source code interface that an operating system or library provides to support requests for native services to be made of it by computer programs such as application$_{(i)}$ 202. Native API 204 communicates with operating system framework 206 to manage data communications from application 202$_{(i)}$.

Operating system framework 206 processes data communications and communicates the results of the processing to native display driver 208, which may drive any number of native displays$_{(m)}$ 210. In some embodiments, a native display driver may include: a WINDOWS™ driver, a WINDOWS™ CE driver, a WINDOWS™ mobile driver, an APPLE™ iphone driver, An APPLE™ OS X driver, a Linux driver, a UNIX driver, and a UNIX derivative driver. Operating system framework 206 may be configured to provide any number of system resources without departing from the present invention. In some embodiments, a framework may include: a WINDOWS™ framework, a WINDOWS™ CE framework, a WINDOWS™ mobile framework, an APPLE™ iphone framework, An APPLE™ OS X framework, a Linux framework, a UNIX framework, and a UNIX derivative framework. Native display driver 208 may then send a native display signal to native display$_{(m)}$ 210. A resulting graphical user interface may then be displayed on native display$_{(m)}$ 210. In some embodiments, a native display may be a refresh based high frequency (REHF) display such as: an LCD display, a CRT display, and LED display, a PLED display, an OLED display, and a plasma display.

Heterogeneous display hardware design can deliver many new classes of non-native (i.e., EPD) usage models, including: (1) the capability to extend (or migrate) an native display-based applications to a non-native display for better reading experience where a user may also browse the pages on a non-native display without changing the application; and (2) the ability to create dual-display aware applications that can take advantages of the unique benefits of both native and non-native displays at the same time. As illustrated here, non-native API 220 may be configured to be responsive to programmatic instructions between application$_{(i)}$ 202 and operating system framework 206. In turn, operating system framework 206 processes programmatic instructions and communicates the results of the instructions to non-native display driver 222, which may drive any number of non-native displays$_{(n)}$ 226 by sending a non-native display signal. In some embodiments, non-native display driver 222 may also be configured as part of a non-native display sub-system that contains a non-native windows management system along with a non-native UI input system in addition to the non-native display driver. In some embodiments, a non-native display may be a bistable, low frequency (BILF) display such as an electronic paper display (EPD). In addition, non-native user interface$_{(o)}$ 230 may be utilized to provide navigation control corresponding with applications being displayed on non-native display$_{(n)}$ 226.

As may be appreciated, BILF displays may not be particularly well suited to navigation through a graphical user interface (GUI). One reason for this is because the refresh rate may be too slow to provide an efficient and effective user experience. However, continually transferring GUIs between a BILF and REHF to accomplish all navigation tasks may also detract from a user experience. Thus, at least some navigation capabilities may be desirable. Non-native user interface$_{(o)}$ 230 may include non-native user interface driver 228, which may communicate with application$_{(i)}$ 202 via non-native API 220 through a communication mechanism such as: a command, an API call, a callback function call, a pipe, a signal, a message, a shared memory, a semaphore, a mutex, a critical section, an event, a socket, a clipboard, a message, a message queue or any other communication mechanism known in the art without departing from the present invention. Thus when application initiates contact with non-native driver 222 via non-native API 220, a communication mechanism is configured for non-native driver 222 and application 202. Once a communication mechanism is configured, non-native driver 222 and application 202 may communicate with one another. For the purpose of description, API call and callback is used to explain the communication mechanism between the application and non-native driver.

Figure 3:
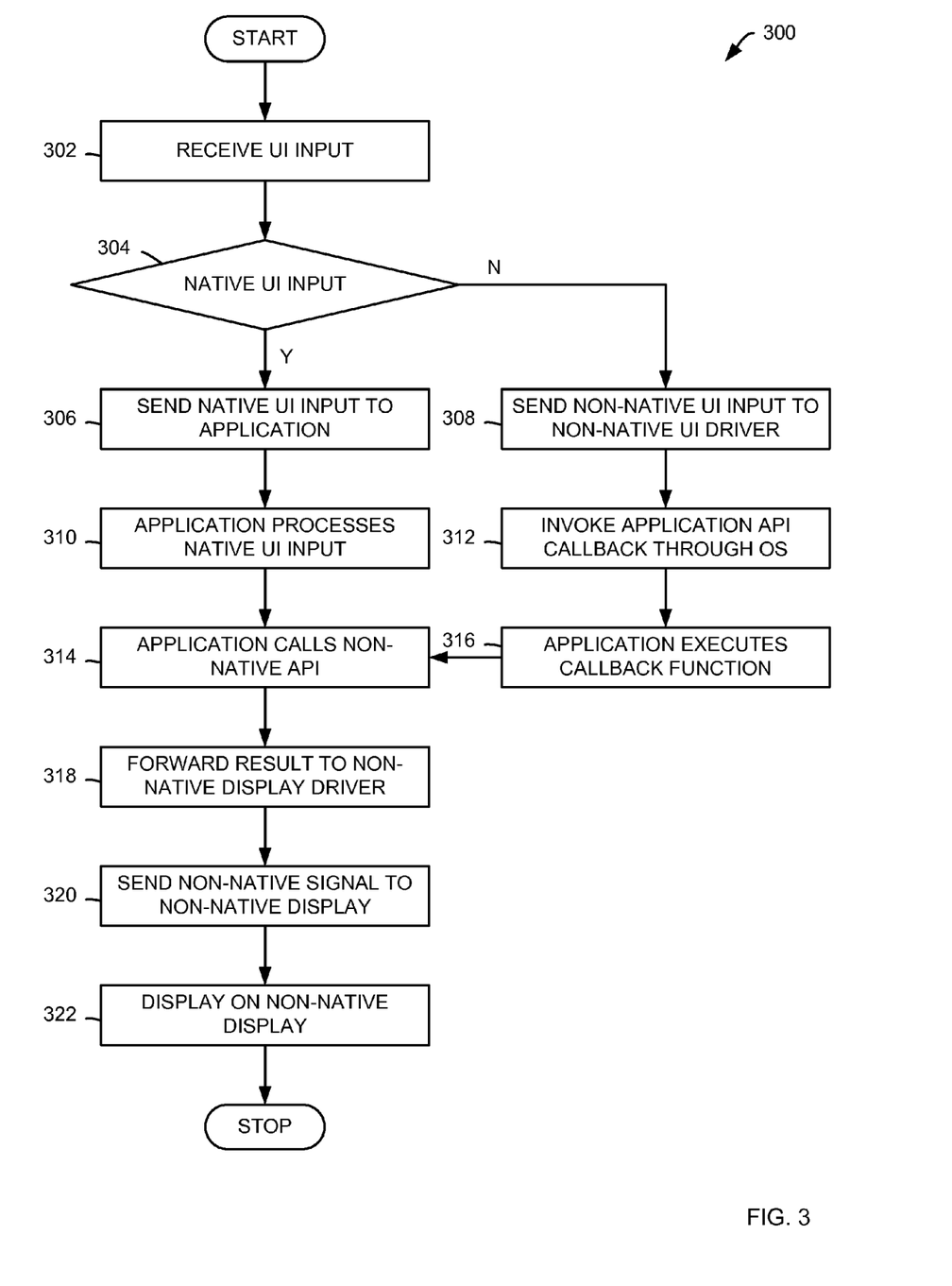
FIG. 3 is an illustrative flowchart of methods for utilizing a non-native API in accordance with embodiments of the present invention.

FIG. 3 is an illustrative flowchart 300 of methods for utilizing a non-native API in accordance with embodiments of the present invention. At a first step 302, a UI input is received. In embodiments, a UI input may include any number of inputs generated from a programmatic related interface, such as a GUI or a physical UI. Inputs may also include programmatic inputs from other sources such as an OS framework, for example, without departing from the present invention. At a next step 304, the method determines whether a UI input is a native UI input. A native UI input, in some embodiments, is any input received from native sources, such as a native GUI or native physical UI. A non-native input, in some embodiments, is any input received from a non-native source, such as a non-native GUI or non-native physical UI. Non-native sources will be discussed in further detail below. If the method determines, at a step 304, that the input is a native UI input, the method proceeds to a step 306 to send the native UI input to a corresponding application. Typically, the native UI input is handled by the operating system (OS). As may be appreciated, a corresponding application may be any application capable of receiving a native UI input as defined herein without departing from the present invention.

At a next step 310, a corresponding application processes the native UI input. The corresponding application may process the native UI input in any manner known in the art without departing from the present invention. Returning to a step 304, if the method determines, at a step 304, that a UI input is a non-native UI input, the method proceeds to a step 308 to send the non-native UI input to a non-native UI driver. Typically, the non-native UI input is handled by the OS. In some embodiments, a non-native UI input may be utilized to provide some navigation capability of a corresponding application. For example, a button or toggle switch may be located on a non-native display to provide user input. As may be appreciated, bistable displays as contemplated herein, are not generally suitable for dynamic GUI input. At least one reason for this characteristic is because refresh rates are typically low (i.e., 1 to 15 frames per second (fps)). Thus, unacceptable latency, when utilizing a GUI, may be introduced and may not provide a satisfactory user experience. Non-native UI inputs may be utilized to overcome this deficiency. At a next step 312, a corresponding application is invoked by a callback function. Typically, a callback function is handled by the OS. As noted above, a callback is executable code that is passed as an argument to other code or application. Callback allows a lower-level software layer to call a subroutine (or function) defined in a higher-level layer. At a next step 316, a corresponding application executes a callback function.

At a next step 314, the method calls a non-native API embodiment. An API is defined at source code level and provides a level of abstraction between the application and the kernel (or other privileged utilities) to ensure the portability of the code. A non-native API, in accordance with embodiments described herein, may be utilized to provide application compatibility with non-native displays. In some embodiments, a non-native display may include a bistable, low frame rate display. In some embodiments, non-native displays may include an electronic paper display (EPD). In some embodiments, an EPD may be configured to refresh at a rate up to approximately 15 fps. At a next step 318, the method forwards the result of the processing of the non-native input to a non-native display driver. In embodiments, the result may be data, a data pointer, or a command. At a next step 320, a non-native signal is sent to a non-native display in accordance with all non-native display requirements, whereupon the non-native signal is displayed on a non-native display at a step 322. The method then ends.

It may be appreciated that any number of corresponding applications may be utilized with embodiments described herein. In some embodiments, inputs may be received from one or more applications. Furthermore, embodiments provided herein may be utilized for enabling complementary dual display utility. For example, a non-native display and a native display may be utilized in concert without restriction. In some embodiments, a native display is a refreshed based high frame rate display. In some embodiments, native displays may include an LCD display, a CRT display, and LED display, a PLED display, an OLED display, and a plasma display. In some embodiments, a native display may be configured to refresh at a rate of approximately 15 to 120 fps. Some embodiments disclosed native displays are intended to function simultaneously with non-native displays without limitation. Native UI inputs may be handled conventionally by a native API to function in concert with non-native UI inputs.

Non-Native API Functions

The following is a list of non-native API functions for providing dual display capability for embodiments described herein. The list is not intended to be exhaustive or self-limiting in any fashion. Additionally, the nomenclature utilized for the functions described is arbitrary and not intended to be limiting in any fashion. Functionality for each term is also included, but the manner in which that functionality is accomplished is not limited in any manner in embodiments described herein.

Initialize( ): This function operates to initialize a non-native display driver. A non-native display driver includes window management capability.

GetDisplayConfig( ): This function operates to GET a current system's complementary display configuration parameters including: number of complementary display parameters, resolution parameters, screen-size/DPI parameters, greyscale/color parameters, and bit-depth parameters.

AllocateEPDWindow( ): This function operates to allocate the following: a non-native display window from a non-native display driver, a display number, a non-native window size/fullscreen, a support/unsupport dynamic non-native window size change, a support/unsupport content synchronization with other applications, a minimal non-native window size, a non-native window name, and a use auto-update or a use manual-update.

ChangeWindow( ): This function operates to change a window size, or move a window to another display (i.e., between native and non-native displays, or any combination thereof).

CloseWindow( ): This function operates to close a non-native display window on a non-native display.

SetSyncContent( ): This function operates to synchronize content from different application windows on a non-native display.

UpdateWindow( ): This function operates to call a non-native display driver to update a non-native display window.

RefreshEPD( ): This function operates to refresh a non-native display.

PrintScreen( ): This function operates to print a screen displayed on a native display to a non-native display.

Non-Native API Callbacks

In addition to the above API functions, a non-native API may include callbacks. As noted above, a callback is executable code that is passed as an argument to other code or application. Callback allows a lower-level software layer to call a subroutine (or function) defined in a higher-level layer. As above, the following is a list of non-native API callbacks for providing dual display capability for embodiments described herein. The list is not intended to be exhaustive or self-limiting in any fashion. Additionally, the nomenclature utilized for the functions described is arbitrary and not intended to be limiting in any fashion. Functionality for each term is also included, but the manner in which that functionality is accomplished is not limited in any manner in embodiments described herein.

OnEPDKeyDown( ): This callback operates to handle non-native UI key events. In some embodiments, key events include: Page Up, Page Down, Switch Window, Size Up, Size Down, Full-screen/Partial-screen.

OnEPDWindowChange( ): This function operates to handle window allocation on non-native displays. For example, an application may allocate a new window on a non-native display when a user engages a Full/Partial screen key thus changing the non-native display window.

OnEPDSyncChange( ): This function operates to handle window updates. For example, if an application's window supports content synchronization, then the application may need to update window content after a synchronization event occurs.

OnEPDOrientChange( ): This function operates to update a non-native window when a non-native display changes orientation.

USE EXAMPLES

Figure 4:
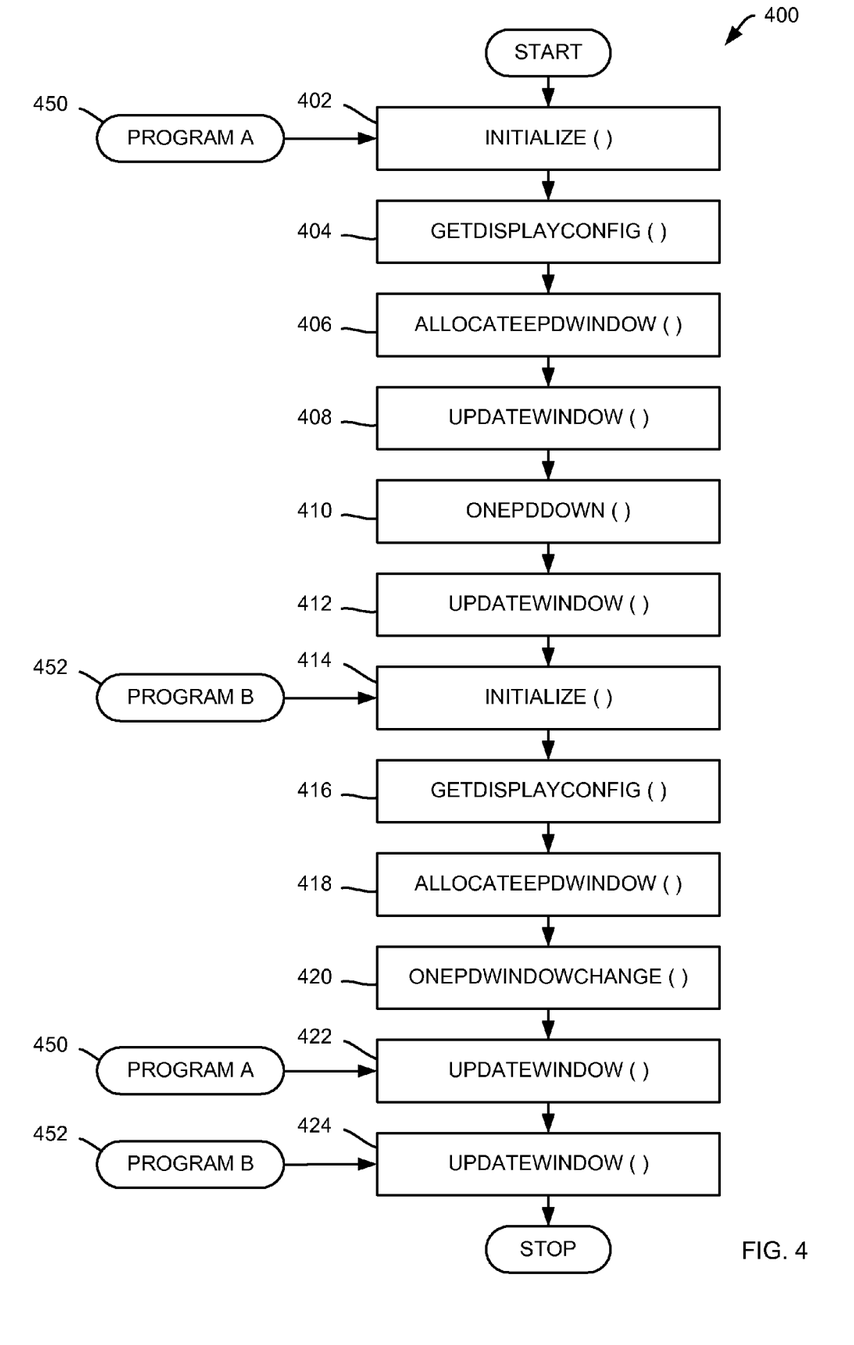
FIG. 4 is an illustrative flowchart of a use case for utilizing multiple applications with a non-native display in accordance with embodiments of the present invention.

A number of use examples are provided for further understanding and clarifying embodiments of the present invention and are not intended to be limiting in any manner. FIG. 4 is an illustrative flowchart 400 of a use case for utilizing multiple applications with a non-native display in accordance with embodiments of the present invention. In particular, program A 450 operates to display a window on a non-native display whereupon program B 452 adds a new window on the non-native display. At a first step 402, program A 450 connects with a non-native display driver and calls function Initialize( ) to initialize the non-native display driver. At a next step 404, program A 450 calls GetDisplayConfig( ) to gather all current non-native display configurations. Window allocation is handled at a next step 406 by calling AllocateEPDWindow( ). In this example, dynamic-change for the window is supported. At a next step 408, a window update may be made when program A 450 calls UpdateWindow( ). At this point in time, a user may wish to utilize a non-native UI by pressing an event key such as a page down key at a step 410. The user input driver triggers OnEPDKeyDown( ), which is a callback function. Once this event is processed, UpdateWindow( ) is called at a step 412 to refresh the non-native display window.

A second program, program B 452, may then connect with the non-native display driver and call function Initialize (to initialize the non-native display driver at a step 414. At a next step 416, program B 452 calls GetDisplayConfig( ) to gather all current non-native display configurations. Window allocation is handled at a next step 418 by calling AllocateEPDWindow( ). In this example, program B 452 requests a partial window. At this point program B's 452 window request triggers OnEPDWindowChange( ), which is a callback function. This allows program A's 450 window to change. Thus, at a next step 422, program A 450 calls UpdateWindow( ) to refresh its non-native display window. Subsequently, at a next step 424, program B 452 calls UpdateWindow( ) to refresh its non-native display window. The method then ends. In this manner, FIG. 4 illustrates one example of how two programs (e.g., Program A and B) may share a non-native display screen having two separate windows through the use of the non-native APIs and Callbacks described.

Figure 5:
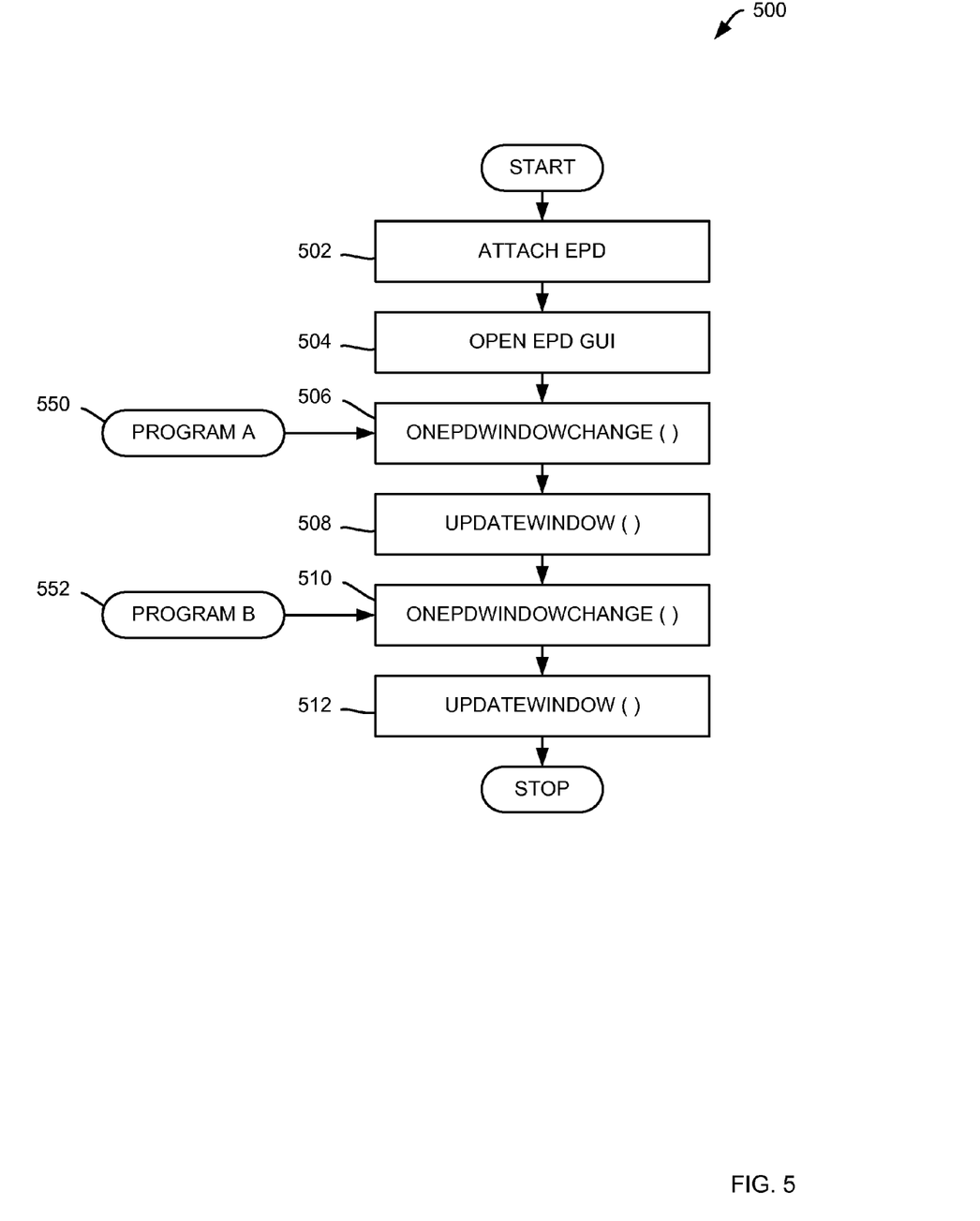
FIG. 5 is an illustrative flowchart of a use case for utilizing multiple applications with multiple non-native displays in accordance with embodiments of the present invention.

FIG. 5 is an illustrative flowchart 500 of a use case for utilizing multiple applications with multiple non-native displays in accordance with embodiments of the present invention. In particular, a second non-native display is added to a system already utilizing a non-native display. At a first step 502, a new non-native display is attached with a current system. A non-native display driver may be configured to detect the addition of the new non-native display. In some embodiments, a native GUI on a native display may be provided to assist in configuring the new non-native display at a step 504. In this example, a user wishes to migrate program A 550 from a current non-native display to a new non-native display via the native GUI. Once the user selection is complete, the non-native display driver triggers an OnEPDWindowChange( ), which is a callback function for program A 550 at a step 506. At a next step 508, program A 550 calls UpdateWindow( ) to refresh the new non-native display. If a second program is present, such as program B 552, a window may be changed when program A 550 is migrated to the new non-native display. Thus, OnEPDWindowChange( ) is triggered for program B 550 at a step 510, whereupon program B 550 calls UpdateWindow( ) to refresh the current non-native display at a step 512. The method then ends. In this manner one or more programs may utilize a non-native display being added to a system. In addition, a window may be moved from one non-native display to another.

Figure 6:
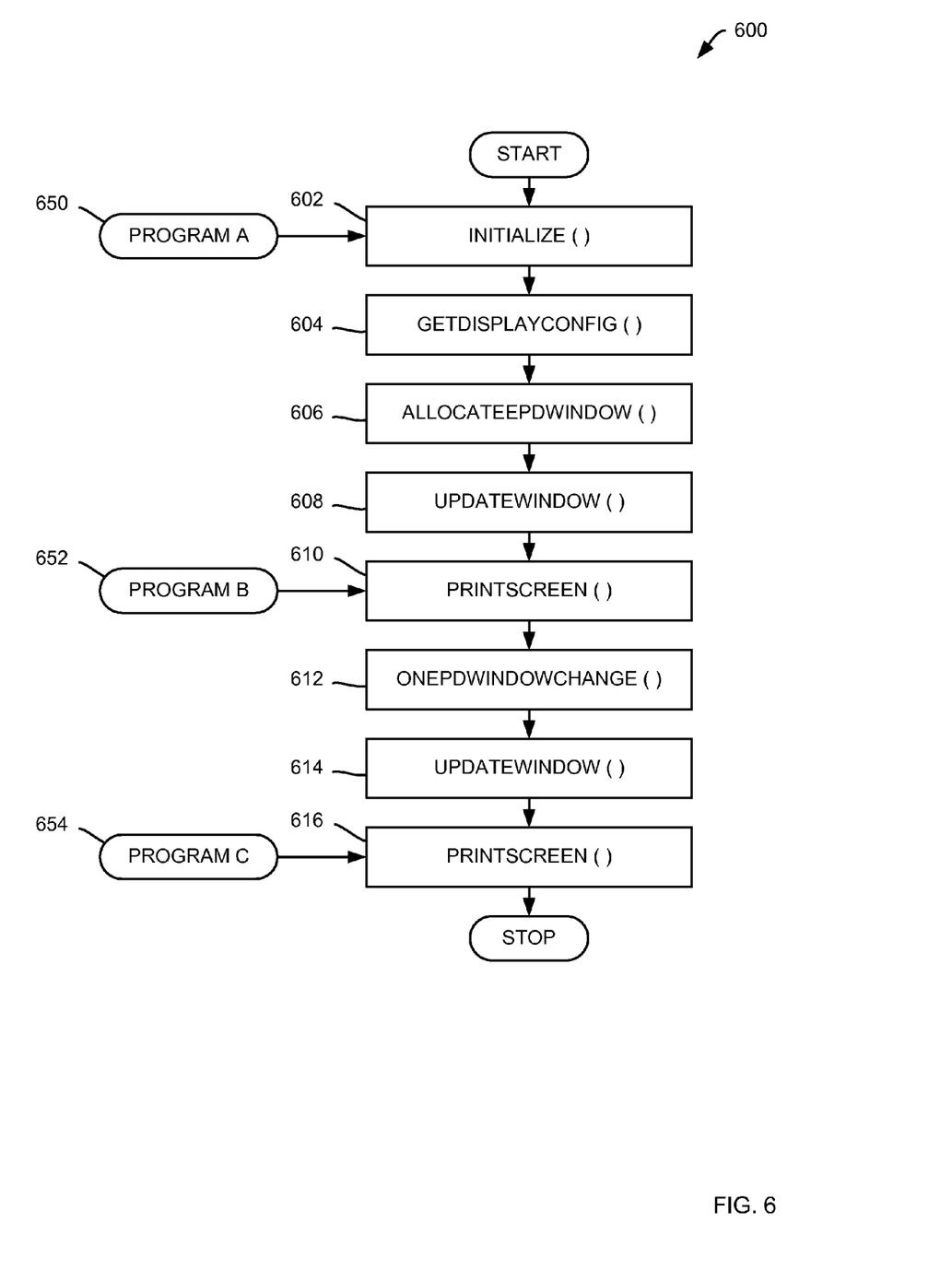
FIG. 6 is an illustrative flowchart of a use case for utilizing multiple applications with native and non-native displays in accordance with embodiments of the present invention.

FIG. 6 is an illustrative flowchart 600 of a use case for utilizing multiple applications with native and non-native displays in accordance with embodiments of the present invention. In particular, three programs originating on the native display may be subsequently displayed on a non-native display. At a first step 602, program A 650 connects with a non-native display driver and calls function Initialize ( ) to initialize a non-native display driver. At a next step 604, program A 650 calls GetDisplayConfig( ) to gather all current non-native display configurations. Window allocation is handled at a next step 606 by calling AllocateEPDWindow( ). In this example, dynamic-change for the window is supported. At a next step 608, a window update may be made when program A 650 calls UpdateWindow( ). At some point, program B 652 is started on a native display. At a next step 610, program B 652 calls PrintScreen( ), to print a screen displayed on the native display to the non-native display. To print program B 652 to the non-native display, OnEPDWindowChange( ) is triggered for program B 550 at a step 612, whereupon program B 550 calls UpdateWindow( ) to refresh the current non-native display at a step 614. At some point, program C 654 is started on a native display. At a next step 616, program C 654 calls PrintScreen( ), to print a screen displayed on the native display to the non-native display. As above, program C may be configured to trigger similar actions like Program B, however detailed steps are not repeated here. The method then ends. In this manner, any number of applications may print a screen from a native display to a non-native display.

Furthermore, a program may toggle a window of the program or a "frame" of a window of the program from a native display to a non-native display. A "frame" in the case of a HTML browser program allows an author to divide a browser window into multiple (rectangular) regions. Multiple documents may be displayed in a single window, each within its own frame. Graphical browsers allow these frames to be scrolled independently of each other, and links may update a document displayed in one frame without affecting the others. Therefore, a frame is like a rectangular region inside a window for a browser program or any other program. The following two examples illustrate "toggle window" and "toggle frame".

"Toggle Window" Example

Application A originally utilizes multiple windows on one or more native displays. In order to utilize a non-native display, application A changes its implement of creating and updating one of the windows previously displayed on a native display. Application A connects with a non-native display driver, acquires a new non-native display window by a call such as AllocateEPDWindows( ), draws the original window's content to the new non-native window, and then calls UpdateWindow( ) to update the non-native window's content to the non-native display. All remaining original windows may still be displayed on native display, and may receive user input. This method of migrating an application is referred to as, "toggle window." The method described here is typically used by a dual-display aware program that is written to access both the native and non-native displays at the same time.

"Toggle Frame" Example

Application B originally utilizes multiple frames (regions inside a window) in a window on a native display. In this example, one frame may contain an independently scrollable text content that can be easily displayed on a single display thus requiring scrolling or some other method (such as Page Down button) for access. In order to utilize a non-native display, application B connects with a non-native display driver, acquires a new non-native display window by calling AllocateEPDWindows( ), draws its frame's content to a non-native window, and calls UpdateWindow( ) to update non-native window content to a non-native display. A non-native pagedown input command may be invoked by a non-native UI, and sent to application B through a non-native API. Application B then processes the non-native pagedown input command, updates its non-native window content. Application B's frame content may continue to show or hide on native display. That is, the application may continue to receive user input. This method of migrating applications is referred to as, "toggle frame."

Figure 7:
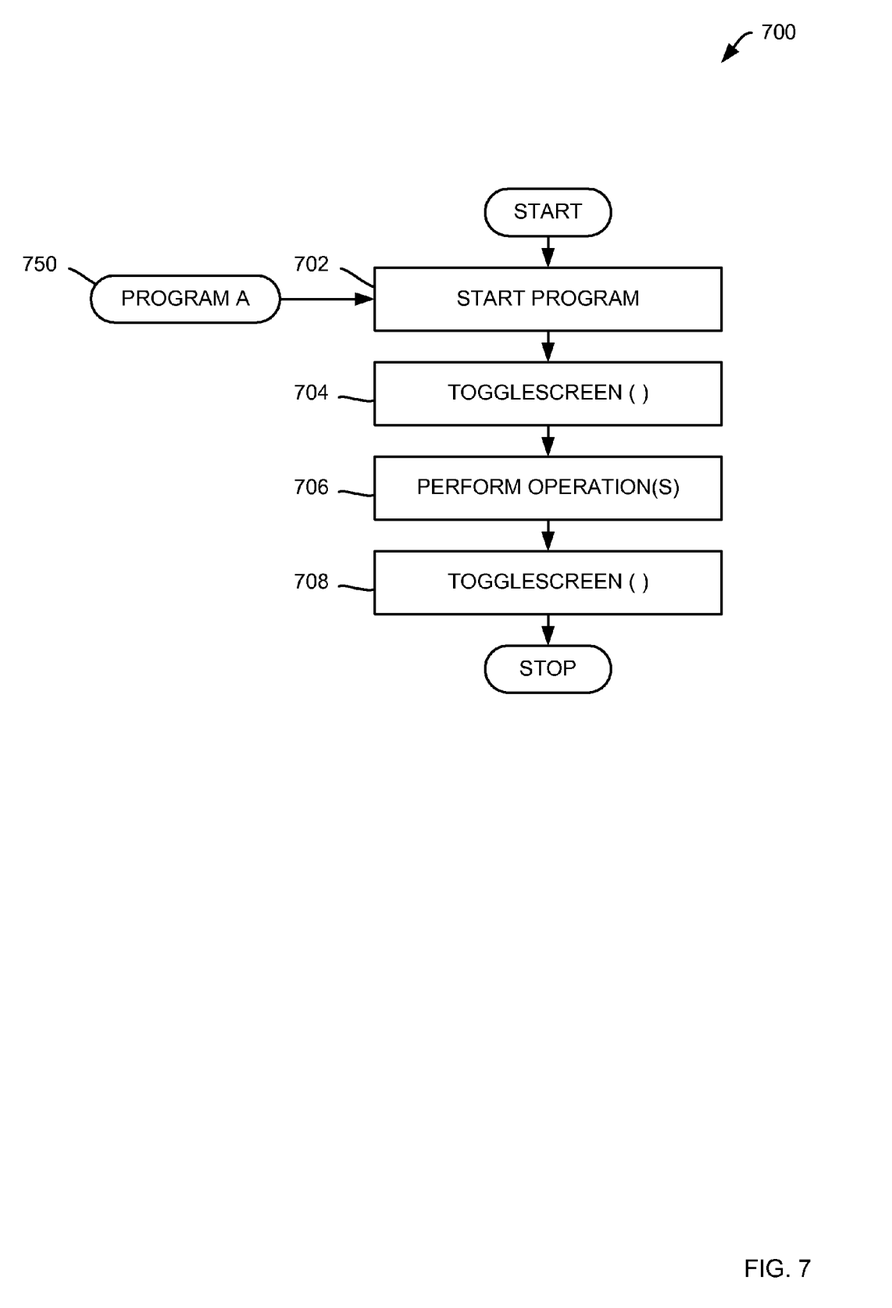
FIG. 7 is an illustrative flowchart of a use case for utilizing an application with native and non-native displays in accordance with embodiments of the present invention.
Figure 8:
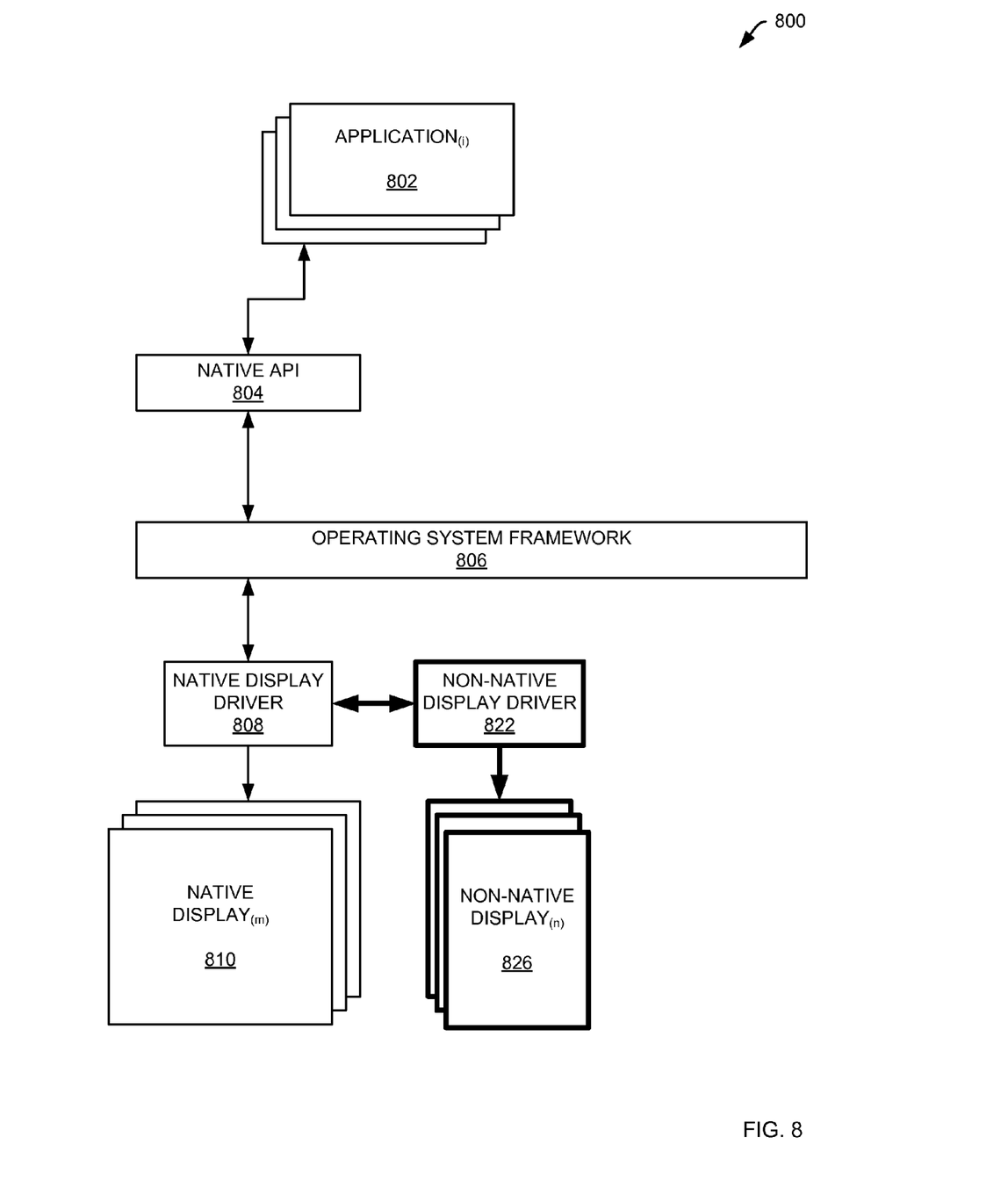
FIG. 8 is an illustrative representation of a native and non-native display subsystem for utilizing a native display and a non-native display in accordance with embodiments of the present invention.

The above "toggle window" and "toggle frame" examples describe applications that are dual-display aware when they are written. For legacy LCD-only applications that have not been migrated to non-native displays, a method for migrating applications referred to as "toggle screen" may be useful to provide non-native display without a need for utilizing any additional programmatic code above the OS framework. FIG. 7 is an illustrative flowchart 700 of a use case for utilizing an application with native and non-native displays in accordance with embodiments of the present invention. In particular, this example demonstrates the use of toggle screen in embodiments provided. FIG. 7 will be discussed in connection with FIG. 8, which is an illustrative representation of a native and non-native display subsystem 800 for utilizing a native display 810 and a non-native display 826 in accordance with embodiments of the present invention. In particular, FIG. 8 illustrates one extension of FIG. 2. As illustrated, applications$_{(i)}$ 802 may be running on a conventional operating system framework 806. Applications$_{(i)}$ 802 may be in cooperative communication with native API 804. Applications$_{(i)}$ 802 may not be aware of the existence of non-native display 826 or of non-native display driver 822. As illustrated, native display driver 808 may handle communication with non-native display driver 822.

As noted above, non-native displays may not be well-suited for navigating an application due to latency issues. Toggling allows a user to easily migrate an application between a non-native display and a native display so that navigation may proceed on the most appropriate platform. Returning to FIG. 7, at a first step 702, program A 750 (i.e. applications$_{(i)}$ 802, FIG. 8) is started on a native display such as native display 810. In embodiments, programs may display content on a native display utilizing any graphical user interface such as a window or frame without limitation. To toggle, ToggleScreen( ) may be triggered at a step 704. To toggle, a native display driver 808 may send display data and command data generated by applications$_{(i)}$ 802 (program A 750) to non-native display driver 822. Non-native display driver 822 may operate to first extend applications$_{(i)}$ 802 (program A 750) native display window to a non-native display window resolution and then display the non-native display window on non-native display 826. In embodiments, programs may display content on a non-native display utilizing any graphical user interface such as a window or frame without limitation. Returning to FIG. 7, at a next step 706, any number of non-native display operations may occur, such as scroll, page down, page up, etc. When a user desires to migrate applications$_{(i)}$ 802 (program A 750) back to a native display 810, the method triggers ToggleScreen( ) at a step 708. The method then ends. Native display driver 808 stops sending display data and command data to non-native display driver 822 and continues to draw content on native display 810.

It may be noted that printing an application to a non-native display as described for FIG. 6 is different than toggling an application to a non-native display as described for FIG. 7. In printing, a window is displayed on a non-native display, but functionality of the application remains with a native display. This may be useful in situations where a user desired to keep a high resolution screen shot of a reading program while continuing to navigate the application. Toggling, on the other hand, migrates the application to the non-native display. Thus, if additional navigation is needed, other than what is provided by non-native UI inputs, the application must be migrated back to a native display.

Additional Features

It may be appreciated that additional features may be incorporated into use models described herein. Any combination of these features may be utilized without departing from the present invention.

Native Display On/Off

In embodiments, in order to conserve battery power while utilizing a non-native display, a user may use an additional UI (which may, in some embodiments, be a non-native UI) to turn the native display on and off. Turning a native display off during non-native display use may reduce power consumption due to the backlight of a native display. When the native display is turned off, the system may be further configured to enter a standby power-saving mode much like a phone device. In standby mode a system would typically "wake-up" in order to update the non-native display when content has been changed (e.g., by a page change when reading a book). When a user turns the native display on the systems may be configured to enter dual display mode operation again.

Video Out of Native or Non-Native Display Screens

In embodiments, to facilitate public viewing of native and non-native display content through a projector, a user may use an additional UI to select whether to project content from either native or non-native displays to a video out port of the device. Traditionally, video output was limited to native display content.

Non-Native Windows Manager

In embodiments, a system utilizing a non-native display windows manger with a non-native display driver as described herein may support multiple windows (of the same program or different programs) on one or more non-native display screens. An additional UI may provide functionality which allows a user to select an active window (from a list of non-native display windows working under the operating system) and display the updated content on the non-native display. Furthermore, the additional UI may provide functionality which allows a user to change the size of window from a partial screen size to a full screen size (and vice versa). Thus, resizing functionality may be provided. These features may be beneficial for users viewing content across multiple windows on a non-native display without requiring them to turn on the native display to navigate content.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for controlling complementary dual displays for use with an electronic device comprising:
    receiving a first input for display on a non-native display, wherein the first input includes a first native user interface (UI) input, and wherein the non-native display is a bistable, low frame rate display;
    responsive to the first native UI input:
        sending the first native UI input to at least one corresponding application,
        processing the first native UI input by the at least one corresponding application,
        calling a non-native API for forwarding a result of the processing of the first native UI input to a non-native display driver, wherein calling the non-native API comprises: invoking a communication mechanism corresponding with the non-native API to facilitate communication with the at least one corresponding application, and processing the communication mechanism by the at least one corresponding application, and
        sending a non-native display signal to the non-native display;
    responsive to receiving a non-native UI input:
        sending the non-native UI input to a non-native UI driver,
        invoking a communication mechanism corresponding with the non-native API to communicate the non-native UI input to the at least one corresponding application,
        processing the non-native UI input by the at least one corresponding application,
        calling the non-native API for forwarding a result of the processing of the non-native UI input to the non-native display driver, and
        sending a non-native display signal to the non-native display;
    receiving a second native UI input for display on a native display, wherein the native display is a refresh-based, high frame rate display;
    sending the second native UI input to the at least one corresponding application; processing the second native UI input by the at least one corresponding application;
    calling a native API for directing the processed second native UI input to a native display driver; and
    sending a native display signal to the native display.

2. The method of claim 1, wherein the communication mechanism is selected from the group consisting of: a command, an API call, a callback function call, a pipe, a signal, a message, a shared memory, a semaphore, a mutex, a critical section, an event, a socket, a clipboard, a message, and a message queue.

3. The method of claim 1, wherein the first native UI input and the second native UI input correspond with a same application of the at least one corresponding application.

4. The method of claim 1, wherein the first native UI input and the second native UI input correspond with a different application of the at least one corresponding application.

5. The method of claim 1, wherein the non-native display includes a non-native UI, the non-native UI configured to provide at least some navigation of the at least one corresponding application, wherein the at least some navigation is enabled via the non-native API.

6. The method of claim 5, wherein the non-native UI is further configured to provide access to a power switch for the native display while the non-native display is utilized.

7. The method of claim 5, wherein the non-native UI is further configured to provide a video out selection for content from the native display and the non-native display.

8. The method of claim 1, wherein the non-native API includes a plurality of functions and callbacks, the plurality of functions and callbacks selected from the group consisting of: Initialize( ) GetDisplayConfig( ) AllocateEPDWindow( ), ChangeWindow( ), CloseWindow( ), SetSyncContent( ), UpdateWindow( ), RefreshEPD( ), OnEPDKeyDown( ) OnEPDWindowChange( ), OnEPDSyncChange( ), PrintScreen( ) and OnEPDOrientChange( ).

9. The method of claim 1, further comprising: sending the non-native display signal to at least one additional non-native display.

10. The method of claim 9, wherein the non-native display signal includes a content window configured for moving from the non-native display to the at least one additional non-native display.

11. The method of claim 10, wherein the non-native UI is further configured to provide selection of an active non-native display window to display a content window on the non-native display.

12. The method of claim 1, further comprising: terminating the sending the non-native display signal to one of the non-native display and the at least one additional non-native display.

13. The method of claim 1, wherein a non-native UI is further configured to provide a resizing function for the non-native display window.

14. The method of claim 1, wherein the native display is selected from the group consisting of: an LCD display, a CRT display, and LED display, a PLED display, an OLED display, and a plasma display, and wherein the non-native display includes an electronic paper display (EPD).

15. The method of claim 14, wherein the native display is configured to refresh at a rate in a range of 15 to 120 fps.

16. The method of claim 1, wherein the non-native display includes an electronic paper display (EPD).

17. The method of claim 16 wherein the non-native display is configured to refresh at rate of up to 15 fps.

18. The method of claim 1, wherein the native display driver is selected from the group consisting of: a WINDOWS driver, a WINDOWS CE driver, a WINDOWS mobile driver, an APPLE iphone driver, An APPLE OS X driver, a Linux driver, a UNIX driver, and a UNIX derivative OS driver, and wherein the native API is selected from the group consisting of: a WINDOWS enabled API, a WINDOWS CE enabled API, a WINDOWS mobile enabled API, an APPLE iphone enabled API, An APPLE OS X enabled API, a Linux enabled API, a UNIX enabled API, and a UNIX derivative OS enabled API.

19. A method for controlling complementary dual displays for use with an electronic device comprising:
   receiving a first input for display on a non-native display, wherein the first input includes a first native user interface (UI) input, and wherein the non-native display is a bistable, low frame rate display;
   responsive to the first native UI input:
      sending the first native UI input to at least one corresponding application,
      processing the first native UI input by the at least one corresponding application,
      calling a non-native API for forwarding a result of the processing of the first native UI input to a non-native display driver, wherein the non-native API includes a plurality of functions or callbacks, where one or more of the plurality of functions or callbacks are selected from a group consisting of: Initialize( ), GetDisplayConfig( ), AllocateEPDWindow( ), ChangeWindow( ), CloseWindow( ), SetSyncContent( ), UpdateWindow( ), RefreshEPD( ), OnEPDKeyDown( ), OnEPDWindowChange( ) OnEPDSyncChange( ), PrintScreen( ), and OnEPDOrientChange( ), and
      sending a non-native display signal to the non-native display;
   receiving a second native UI input for display on a native display, wherein the native display is a refresh-based, high frame rate display;
   sending the second native UI input to the at least one corresponding application;
   processing the second native UI input by the at least one corresponding application;
   calling a native API for directing the processed second native UI input to a native display driver; and
   sending a native display signal to the native display.

20. The method of claim 19, wherein the first native UI input and the second native UI input correspond with a same application of the at least one corresponding application.

21. The method of claim 19, wherein the first native UI input and the second native UI input correspond with a different application of the at least one corresponding application.

22. The method of claim 19, wherein the non-native display includes a non-native UI, the non-native UI configured to provide at least some navigation of the at least one corresponding application, wherein the at least some navigation is enabled via the non-native API.

23. The method of claim 22, wherein the non-native UI is further configured to provide access to a power switch for the native display while the non-native display is utilized.

24. The method of claim 22, wherein the non-native UI is further configured to provide a video out selection for content from the native display and the non-native display.

25. The method of claim 19, further comprising: sending the non-native display signal to at least one additional non-native display.

26. The method of claim 25, wherein the non-native display signal includes a content window configured for moving from the non-native display to the at least one additional non-native display.

27. The method of claim 26, wherein the non-native UI is further configured to provide selection of an active non-native display window to display a content window on the non-native display.

28. The method of claim 19, further comprising: terminating the sending the non-native display signal to one of the non-native display and the at least one additional non-native display.

29. The method of claim 19, wherein a non-native UI is further configured to provide a resizing function for the non-native display window.

30. The method of claim 19, wherein the native display is selected from the group consisting of: an LCD display, a CRT display, and LED display, a PLED display, an OLED display, and a plasma display, and wherein the non-native display includes an electronic paper display (EPD).

31. The method of claim 30, wherein the native display is configured to refresh at a rate in a range of 15 to 120 fps.

32. The method of claim 19, wherein the non-native display includes an electronic paper display (EPD).

33. The method of claim 32 wherein the non-native display is configured to refresh at rate of up to 15 fps.

* * * * *